United States Patent [19]

Phillips

[11] 4,127,961
[45] Dec. 5, 1978

[54] APPARATUS FOR ENTRAPPING INSECTS

[75] Inventor: Dennis G. Phillips, Lititz, Pa.

[73] Assignee: Pestolite Inc., Lancaster, Pa.

[21] Appl. No.: 671,367

[22] Filed: Mar. 29, 1976

[51] Int. Cl.² ............................................. A01M 1/08
[52] U.S. Cl. ..................................... 43/139; 43/113
[58] Field of Search ................ 43/113, 139, 112, 114, 43/141, 115-117, 136, 138

[56] References Cited

U.S. PATENT DOCUMENTS

| 1,478,330 | 12/1923 | Fowler | 43/136 |
| 2,911,756 | 11/1959 | Geary | 43/114 |
| 3,020,671 | 2/1962 | Potter | 43/113 |
| 3,201,893 | 8/1965 | Gesmar | 43/139 |
| 3,336,694 | 8/1967 | O'Connell | 43/113 |

FOREIGN PATENT DOCUMENTS 665247  1/1938  Fed. Rep. of Germany ............. 43/139

Primary Examiner—Ronald E. Suter

Attorney, Agent, or Firm—Gottlieb, Rackman & Reisman

[57] ABSTRACT

A clean and simple trap for insects. The apparatus includes an ultraviolet lamp mounted in an intermediate portion of a frame, the lamp being disposed behind a clear lens which is transparent to ultraviolet light. A blower or fan is mounted above the lens and projects a curtain of air across the face of the lens. Removable canisters are supported by canister side supports which are disposed below the lens. The removable canisters have an extremely tacky adhesive on the side facing the blower. The unit may also include a dispenser for an airborne attractant such as an odor attractant or a sex attractant. Insects attracted to the unit are caught in the curtain of air and are thrown against the tacky material on the disposable canister. The adhesive acts to entrap the insects as all an insect has to do is to touch the adhesive with a wing, leg, or any other part of its body to become attached to the adhesive. Upon substantially complete coverage of the tacky material with insects the canister is detached from the unit and a new canister is then attached.

12 Claims, 6 Drawing Figures

APPARATUS FOR ENTRAPPING INSECTS

FIELD OF THE INVENTION

The present invention relates generally to insect traps, and more particularly to an insect trap of the type using an ultraviolet light, which may be supplemented by an airborne attractant, the insects attracted to the light being projected by an air curtain into a disposable canister, the canister being coated with a very tacky adhesive which entrap the insects.

BACKGROUND OF THE INVENTION

A number of variety of insect traps are commercially available today. In one common form an ultraviolet light attracts insects to an electrical grid which electrocutes the insects. This form of device may present safety hazards to people in the environment, and also the sound of insects being electrocuted may not be desirable in a commercial establishment such as a restaurant or the like.

Another form of insect trap which utilizes a black or ultraviolet light projects the insects into a tray carrying toxic liquid chemicals. This form of insect trap cannot generally be used in food handling plants or restaurants, and is also somewhat difficult to service.

The patent art also discloses other forms of insect traps which are not in widespread commercial usage. One such form is shown in U.S. Pat. No. 3,336,694 issued Aug. 22, 1967 to Robert A. O'Connell. This form of insect trap projects an air curtain across an ultraviolet lamp, the insects flying toward the lamp and entering the air curtain are thrown into a container. When removing the container from this form of apparatus it has been found that frequently large numbers of insects will fly out of the container as no means are provided within the container itself to insure that the insects will either die or be incapable of leaving the container when the container is being serviced. Therefore this form of insect trap is not popular, particularly with those people who must occasionally empty the containers.

Another form of insect trap is shown in German Pat. No. 665,247 issued Aug. 1, 1935. The trap shown in this patent utilizes two incandescent lamps to attract the insects, a fan, wands which may be coated with a sticky substance, and a trough disposed below the wands to receive the insects. As the wands (18) are not disposable and must be recoated periodically, this form of device has never obtained widespread commercial success.

OBJECTS AND SUMMARY OF THE INVENTION

It is a principal object of the present invention to provide an insect trap capable of overcoming the disadvantages of the prior art traps and which is completely safe, clean, odorless, quiet, effective, reliable, and relatively inexpensive.

More particularly, it is an object of the present invention to provide an insect trap which may utilize two forms of attractant systems, namely ultraviolet light and an airborne attractant, the airborne attractant being added to increase the level of unit effectiveness over that of prior insect traps.

It is a further object of the present invention to provide a safe insect trap which does not utilize any form of toxic or dangerous chemicals, nor dangerous electrocution grids, which unit is completely safe for children, pets, birds, and may be utilized in food handling areas.

It is a further object of the present invention to provide an insect trap provided with a disposable insect receiving canister which may be replaced when full and a new one snapped into place without hands ever touching an insect.

These and other objects and advantages of the present invention will be apparent to those skilled in the art after a consideration of the following detailed description taken in conjunction with the accompanying drawings in which a preferred form of this invention is illustrated. In summary, the invention consists of an apparatus including blower means adapted to discharge a concentrated, nonturbulent high velocity air curtain in front of a clear lens mounted over an intermediate portion of the frame of the apparatus, the blower means being located in an upper portion of the apparatus, there being an ultraviolet lamp mounted within the frame between the lens and the back of the intermediate portion, and the frame additionally including canister side supports mounted below the lens, the canister side supports being provided with front and rear hooks to which a disposable canister may be secured, the disposable canister being formed of sheet-like material provided with an extremely tacky adhesive on that side of the sheet material which faces the blower means. In addition, a dispenser for an airborne attractant is mounted on the frame.

BRIEF DESCRIPTION OF THE VARIOUS FIGURES

DETAILED DESCRIPTION OF A PREFERRED EMBODIMENT

Figure 1:
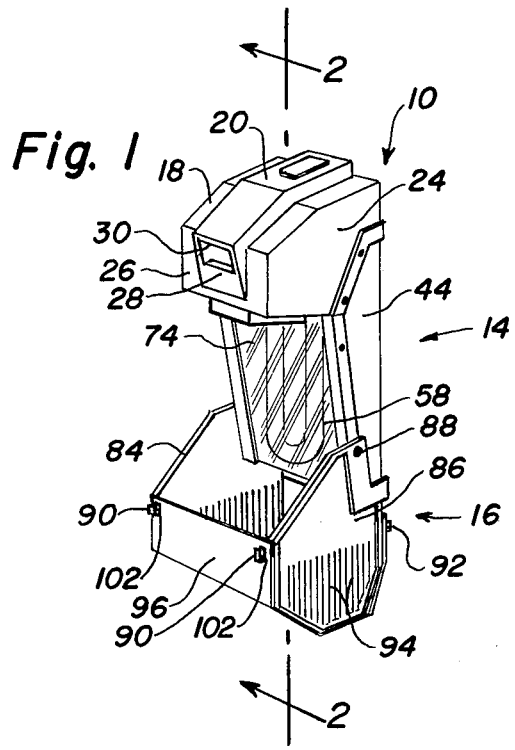
FIG. 1 is a perspective view of the insect trap of this invention, a disposable canister being shown spaced away from the canister side supports of the apparatus.
Figure 2:
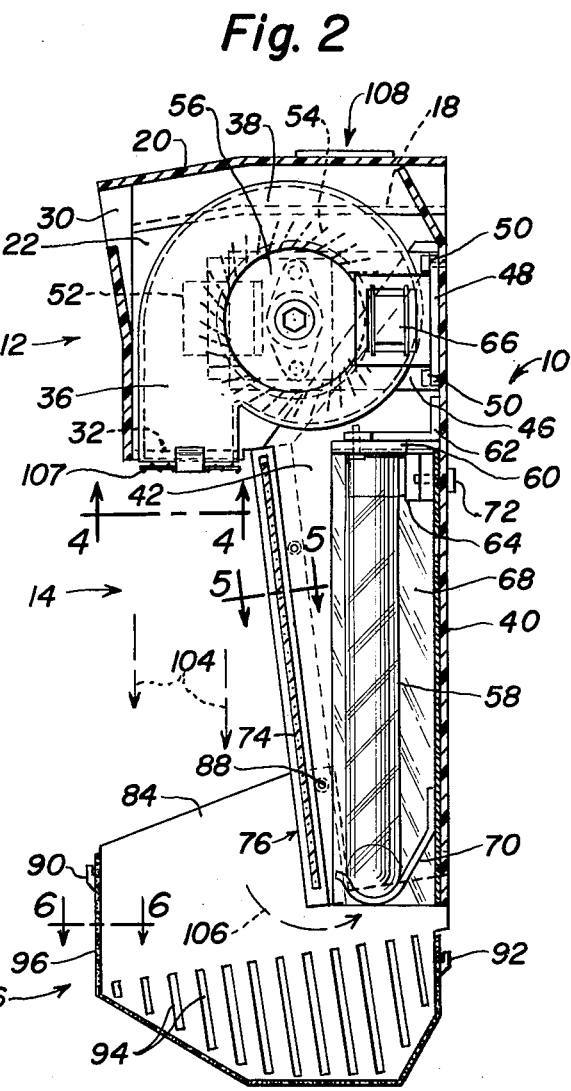
FIG. 2 is a section taken along the line 2 — 2 in FIG. 1.
Figure 3:
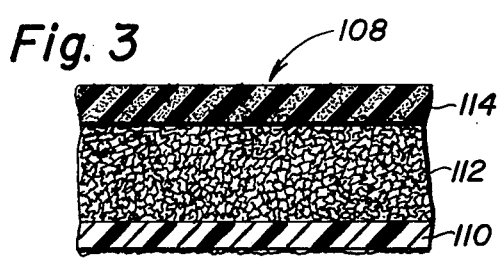
FIG. 3 is a greatly enlarged section through the dispenser for the airborne attractant.
Figure 4:
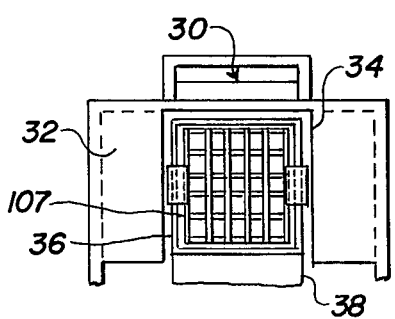
FIG. 4 is a section taken along the line 4 — 4 in FIG. 2.
Figure 5:
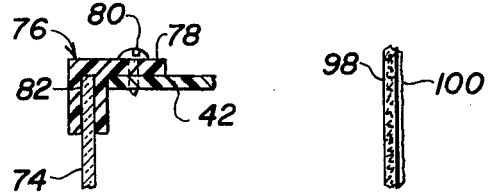
FIG. 5 is a section taken along the line 5 — 5 in FIG. 2.

Referring first to FIGS. 1 and 2, the frame of the apparatus is indicated generally at 10, the upright frame including an upper generally box-like end indicated generally at 12, an intermediate portion indicated generally at 14, and a lower end indicated generally at 16. The upper box-like end includes an upper surface 18 which has a raised center portion 20, left and right opposed side surfaces, 22, 24, respectively, a front surface 26 having a forwardly extending portion 28 provided with an aperture 30, and a forward lower surface 32 provided with a cutout 34 (FIG. 4); the discharge portion 36 of a blower means projects through the cutout 34, the blower means including a fan housing 38. The intermediate portion of the frame includes a back wall 40 which encloses the back of the upper box-like end 12 and left and right spaced apart side walls 42, 44, respectively.

One side of the blower or fan housing 38 (the rear side as seen from FIG. 2) is secured to one leg 46 of an L-shaped supporting member, the other leg 48 of the L-shaped supporting member being secured to the back wall 40 by conventional fasteners 50. A fan or blower motor 52, is supported by the other side of the leg 46, the output shaft of the motor 52 passing through the leg 46 and supporting a centrifugal fan 54 which is provided with an intermediate portion rigidly secured to the motor shaft, the fan being mounted within the housing 38. The inlet opening 56 of the fan housing 38 can receive air which enters the box-like end either through the aperture 30 or from behind the rear of the forward lower wall 32.

A U-shaped near ultraviolet flourescent lamp 58 is received by lamp bases 60 which are supported on the back wall by a suitable bracket 62. A lamp starter and socket indicated generally at 64 and a ballast 66 are also mounted on the back wall 40 of the intermediate frame. Disposed behind the lamp 58 is a reflector 68, the reflector having an intermediate portion and two spaced apart side portions which are disposed at an angle of approximately 40 degrees to the back portion. A clip 70 is disposed in front of the lower intermediate portion of the reflector, the lower end of the clip serving to hold the bottom of the lamp 58 in place. Rivets (not shown) pass through the clip and the lower end of the reflector to secure these components to the back wall 40. In addition, screws 72 pass through the back wall 40 and the upper end of the intermediate portion of the reflector, the screws serving to securely mount the starter and socket 64 and the upper end of the reflector to the back wall 40.

A clear plastic lens 74 preferably of plexiglass or acrylic sheet is provided, which is transparent to ultraviolet light; the lens 74 is mounted on the forward edges of the left and right sidewalls 42, 44. To this end a special mounting strip indicated generally at 76 is provided. The mounting strip includes a mounting flange 78 which is secured to the sidewalls by screws 80, a portion of the mounting strip extending at right angles to the mounting flange and being provided with a groove 82 which receives the lens 74. The groove 82 does not extend the full length of the mounting strip as can best be seen from FIG. 2, but the groove 82 is of a length sufficient to receive the lens 74 and to hold it in place.

The lower end 16 of the frame consists essentially of left and right canister side supports 84, 86, respectively, the side supports being secured to the left and right side walls 42, 44 by fasteners 88. The side supports 84, 86 are essentially identical to each other. The front and rear edges of each of the side supports are provided with outwardly extending hooks 90, 92, respectively. In addition, the side supports are provided with a plurality of generally parallel air passages 94 which extend upwardly from the lower periphery of each of the side supports. The lower periphery of the side supports may be curved, or may be of the shape shown in FIG. 2.

Figure 6:
FIG. 6 is a section taken along the line 6 — 6 in FIG. 1.

A disposable canister 96 is adapted to be mounted on the hooks 90, 92. In this regard it should be noted that the canister is formed of sheet-like material which is initially of a generally rectangular shape. While various materials may be utilized in forming the canister, it will generally be a paper stock coated to prevent adhesive bleed-through. The inside surface of the paper stock is coated with an extremely tacky adhesive 100 (FIG. 6) containing no toxic chemicals. As can best be seen from FIG. 1, the disposable canister is provided with apertures 102 adjacent each corner of the sheet.

In operation, the parts are assembled in the manner shown in FIG. 2 with that side of the canister coated with the extremely tacky adhesive facing the discharge portion 36 of the blower means. When the blower and lamp are operating, which is achieved simply by plugging in a suitable line cord to an electrical outlet, the blower will discharge a concentrated, nonturbulent high velocity air curtain, indicated by the broken arrows 104 towards the lower end of the frame, the face of the lens 74 serving as a back for the air curtain. Flying insects which are attracted by the ultraviolet lamp 58 which enter the air curtain 104 will be projected downwardly against the extremely tacky adhesive on one side of the canister 96. The adhesive serves to entrap the insects, as all an insect has to do is touch the adhesive with a wing, leg, or any other part of its body to become attached and entrapped by the adhesive. After a large percentage of the surface of the canister has become covered with insects all it is necessary to do is to remove the canister from the hooks 90, 92 and throw away the disposable canister 96 and then replace it with a new canister. A new canister is installed simply by passing the hooks 92 through the rear apertures on the new canister and then bending the sheet-like material around the lower periphery of the canister side supports and then placing the hooks 90 through the forward apertures.

The air passages 96 permit a portion of the air discharged by the blower to exit from the canister, and an additional portion of the air discharged by the blower means will be recirculated behind the lens 74 in the manner indicated by the broken arrow 106. The air to inlet opening 56 of the blower means is received from within the box-like upper end, the air entering the box-like upper end either through the forward aperture 30 or from the opening behind the forward lower surface 32. That air which enters from behind the forward lower surface 32 is a portion of the air discharged by the discharge portion 36 of the blower means and is utilized to cool the lamp 58.

It should be appreciated that the apparatus so far described overcomes many of the disadvantages of prior art commercially available constructions. Thus, this device does not employ any toxic chemicals which would prohibit its use in food establishments or the like, and which may also, in fact, be dangerous to those people which must occasionally service the insect trap. Additionally, it does not employ the high voltage electrocution grid employed on many insect traps, which grids may also provide a safety hazard to the operator of the machine, or any one else who may come into contact with the apparatus, and which customarily emits a noise (zap) when electrocuting insects, which noise may be objectionable to people in the vicinity. It should be further observed that all operating portions of this machine are enclosed in such a manner that neither the working portions of the apparatus nor the operator can be injured. In this regard, grille 107 is mounted at the lower end of the discharge portion 36 to prevent any objects from being thrust up into the discharge opening which may injure the fan or the object.

In order to increase the efficiency of this apparatus a dispenser indicated generally at 108 may be employed, the dispenser dispensing over a prolonged time period an airborne attractant. The attractant may be a volatile odor producing substance attractive to insects, such as vanilla extract, or it may be a sex attractant such as "Muscalore" (cis-9-tricosene). The dispenser illustrated is of the type sold under the trade name of HERCON by the Herculite Protective Fabric Corp. of New York, N.Y., the dispenser including an adhesive backing strip 110, an open cell bait reservoir 112, and a slightly porous outer layer 114 through which the volatile attractant may slowly escape over a prolonged period of time. The employment of a sex attractant is particularly beneficial when there are low insect populations in the environment of the insect trap. A further advantage of attractants is that they attract insects where there are additional natural attractants in the immediate environment.

While the preferred structure in which the principles of the present invention have been incorporated is shown and described above, it is to be understood that the invention is not to be limited to the particular details, shown and described above, but that, in fact, widely differing means may be employed in the practice of the broader aspects of the invention.

What is claimed is:

1. An apparatus for entrapping insects comprising in combination:
    a frame including canister support means mounted on one end of the frame;
    an ultraviolet light supported by the frame between the ends thereof;
    blower means mounted on the other end of the frame, the blower means having a discharge portion exhausting a concentrated, non-turbulent high velocity air curtain directly towards said one end of the frame across the ultraviolet lamp; and
    a disposable canister removably secured to the canister support means, the canister including a backing strip formed of sheet-like material, one side of the backing strip being coated with an extremely tacky adhesive, the disposable canister being removably secured to the canister support means in such a manner that the side coated with the extremely tacky adhesive faces the blower means.

2. An apparatus for entrapping insects as set forth in claim 1 wherein the canister support means includes a pair of opposed canister side supports, each canister side support being provided with air passage means to permit the air discharged from the blower means to exit from said one end of the frame.

3. An apparatus for entrapping insects as set forth in claim 2 in which said air passage means includes a plurality of generally parallel passages extending away from the periphery of the canister side support remote from the blower means.

4. An apparatus for entrapping insects as set forth in claim 1 wherein the canister support means includes a pair of side supports, each of the side supports being provided with front and rear outwardly extending hook means disposed above the lower end periphery of the side supports, wherein said disposable canister is flexible and when in a flat form is generally rectangular and is provided with apertures adjacent the four corners thereof, said hook means passing through said apertures when said removable canister is mounted on the side supports.

5. An apparatus for entrapping insects as set forth in claim 1 further including a dispenser for an exposed airborne attractant, said dispenser being mounted on an exterior surface of said frame.

6. An apparatus for entrapping insects as set forth in claim 1 further further including a lens capable of transmitting ultraviolet light, said lens being mounted on the frame between the air curtain and the ultraviolet lamp, there being an air passage behind the lens and adjacent the lamp, said air passage being in communication with an inlet to said blower means whereby a portion of the air curtain discharged by the blower means is recirculated past the lamp and back to the blower means thereby cooling said lamp.

7. An apparatus for entrapping insects comprising in combination:
    blower means adapted to discharge a concentrated high velocity air curtain, said blower means including a centrifugal fan mounted within a fan housing, said fan housing being provided with an inlet opening and a discharge portion;
    a generally upright frame having an upper generally box-like end, an intermediate portion, and a lower end, the box-like end having a forward lower surface provided with a cutout portion and an aperture in another surface, the fan housing being mounted within the box-like end with the discharge portion of the fan housing being in communication with the cutout portion in the forward lower surface and the inlet opening of the fan housing being able to receive air from the aperture and from behind the forward lower surface, the intermediate portion having a back wall the upper end of which forms the back of the box-like end and spaced apart sidewalls extending away from the back wall, and the lower end including a pair of canister side supports, each of said canister side supports being provided with a plurality of generally vertically extending air passages and opposed hooks on the front and rear edges;
    a lens transparent to ultraviolet light, the lens being supported by the forward portion of the spaced apart sidewalls of the intermediate portion of the frame with the upper edge of the lens lying behind the cutout portion;
    an ultraviolet lamp mounted within said frame between the lens and the back of the intermediate portion; and
    a disposable canister removably secured to said canister side supports, said canister being formed of a generally rectangular sheet-like material coated on one side with an extremely tacky adhesive, said sheet being provided with apertures adjacent each corner of said sheet, the hooks on the canister side supports passing through said apertures to removably hold said disposable canister in place with the side bearing the tacky adhesive facing the blower means;
    whereby the high velocity air curtain is discharged across the face of the lens and into the disposable canister causing any insects entering the air curtain to be thrown against the tacky adhesive to become entrapped thereby, a portion of the air curtain being discharged through the vertical air passages in the canister side supports, and another portion of the air curtain passing behind the lens and over the lamp and then back to the inlet in the fan housing to cool the lamp.

8. An apparatus for entrapping insects comprising a housing having upper and lower sections, air blower means in said upper section having a discharge portion for providing a direct, non-turbulent air curtain between said upper and lower sections, an ultraviolet light source disposed between said upper and lower sections and rearwardly of said air curtain to attract said insects toward said air curtain, collecting means directly below said discharge portion and defining an open chamber, and cannister means having a tacky surface and including means for attaching said cannister means to said collecting means for enclosing said open chamber and providing an enclosed terminus for said air curtain to receive and trap said insects therein.

9. An apparatus in accordance with claim 8 including a lens mounted between said upper and lower sections and forwardly of said ultraviolet light source, said lens being transparent to ultraviolet light and defining a rear border surface for said air curtain.

10. An apparatus in accordance with claim 8 wherein said collecting means includes substantially parallel side plates at said lower section to form said open chamber and coupling means on at least one of said side plates for attaching said canister means to said collecting means.

11. An apparatus in accordance with claim 10 wherein said canister means comprises a flexible sheet to which said tacky surface is applied and having a front pair of opposed attachment apertures and a rear pair of opposed attachment apertures, and wherein said coupling means includes a front pair of opposed hooks and a rear pair of opposed hooks on said side plates to receive respectively said front and rear attachment apertures thereover to form said enclosed terminus for said air curtain.

12. An apparatus in accordance with claim 11 wherein said flexible sheet is substantially rectangular in shape and is attached to said hooks with said tacky surface facing upwardly and toward said air curtain to receive said insects forced into said enclosed terminus and to entrap said insects on said tacky surface.

* * * * *